Aug. 27, 1929.  C. B. MOSSI ET AL  1,726,493

HEATER PLATE FOR RANGES, OVENS, AND THE LIKE

Filed June 28, 1924   2 Sheets-Sheet 1

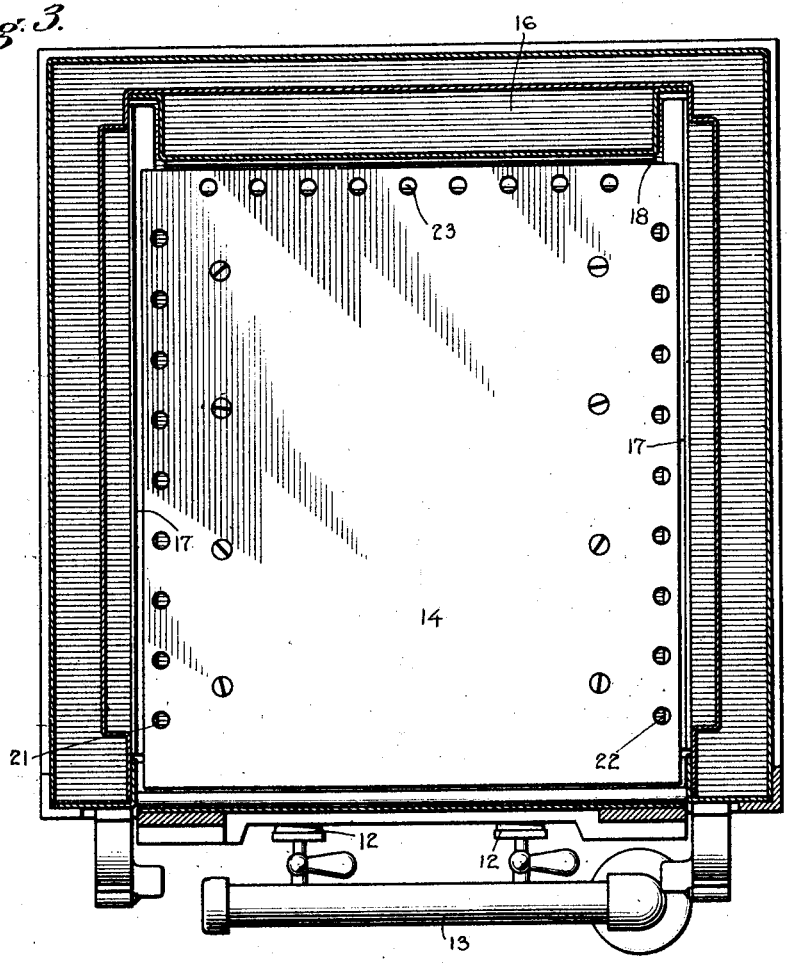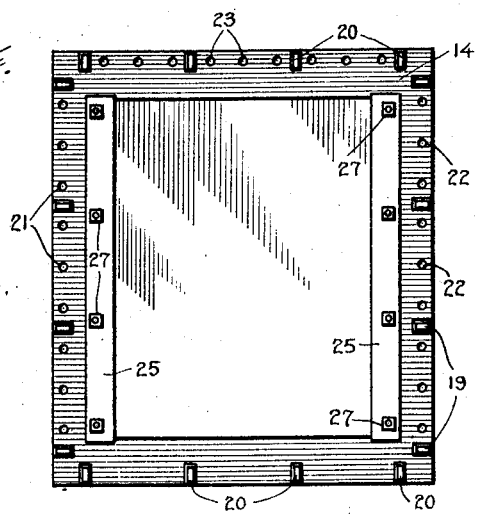

Patented Aug. 27, 1929.

1,726,498

UNITED STATES PATENT OFFICE.

CHARLES B. MOSSI, OF BROOKLYN, AND HENRY ALEXANDER CHEVOLA, OF NEW YORK, N. Y., ASSIGNORS TO L. BARTH & CO. INC., OF NEW YORK, N. Y., A CORPORATION OF NEW YORK.

HEATER PLATE FOR RANGES, OVENS, AND THE LIKE.

Application filed June 28, 1924. Serial No. 723,032.

This invention relates to heater plates for ovens, ranges and the like.

An object of the invention is to provide an improved heater plate for impingement by the flame of a gas burner or the like and mounted freely and removably, and combined with suitable heating plate means for attaining the desired heating effect.

A further object of the invention is to provide a form of mounting of heater plate relative to the heating plate whereby enhanced heating effect by convection currents occurs.

Pursuant to the most preferred form of the invention, our invention comprises an upper or heating plate, of suitable dimensions corresponding to the interior of the oven or other heating device, oppositely disposed series of spaced projections on the under side of the upper plate and adjacent its lateral edges, and a lower or heater plate spaced from the upper plate and freely supported by suitable means carried by said oppositely disposed series of spaced projections.

Further features and objects of the invention will be more fully understood from the following detail description and the accompanying drawings, in which Fig. 1 is a vertical sectional transverse view of the oven portion of a gas range or the like, equipped with our improved combined heating and heater means;

Fig. 3 is a sectional view on line 3—3 of Fig. 2; and

Fig. 4 is a bottom plan view of our combined heating and heater plate, on a somewhat reduced scale.

Figure 1:
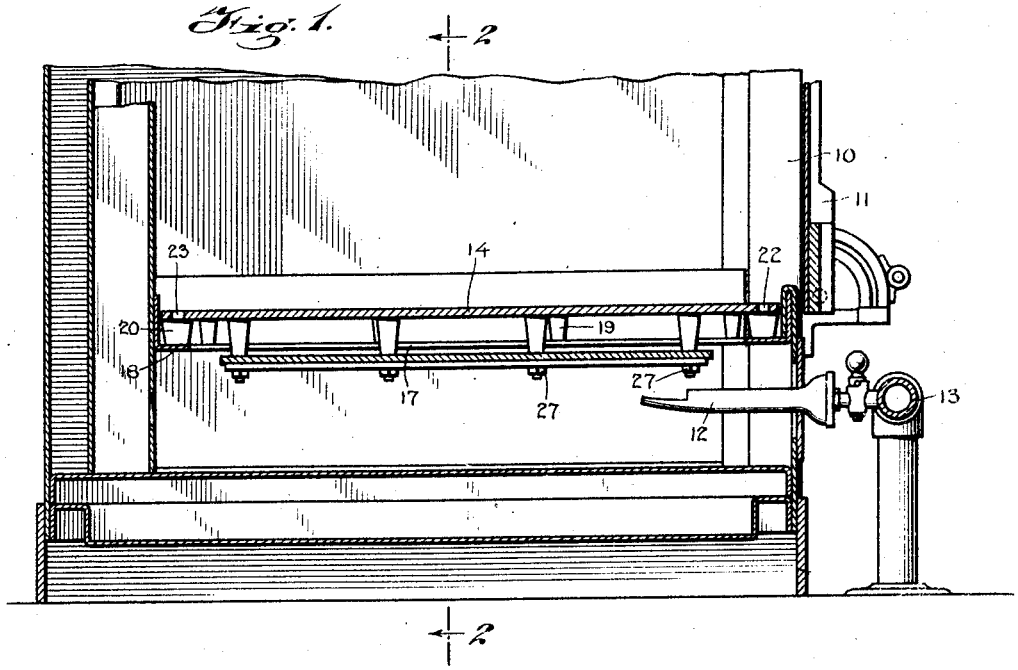
Figure 2:
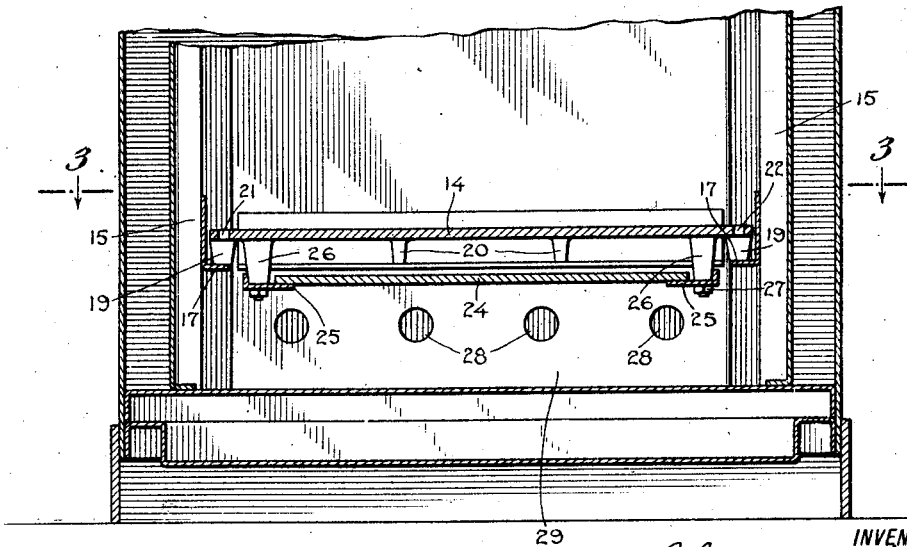
Fig. 2 is a sectional view on line 2—2 of Fig. 1.

Referring to the drawings, the oven 10 is of any approved or standard construction, and is provided with a door 11 to afford access to the interior of the oven; the burners 12 are supplied with illuminating gas or the like from a supply pipe 13, and are of any desired number and arrangement relative to the heater plate.

Our combined heating and heater plate means comprises the upper or heating plate 14, usually serving as a support for pans or other containers for the food to be cooked. The length and width of the heating plate 14 correspond to the interior of the oven 10 and coact with the lateral flues 15 at the opposite sides of the oven and with the flue 16 at the rear of the oven, to afford the desired restricted flow of the air heated by the burners 12. Preferably, the upper plate 14 is supported within the interior of the oven 10 by oppositely disposed side brackets 17, 17 and the rearward bracket 18, and by means of the opposite series of spaced feet or projections 19, 19 and the series of spaced rearward feet or projections 20, 20.

The flow of heated air is enhanced by the provision of the series of perforations 21 through the upper plate 14 adjacent one lateral edge thereof and the perforations 22 adjacent the opposite edge of the upper plate 14, and the series of perforations 23 adjacent the rearward edge of the upper plate 14.

The lower heater plate 24 is freely mounted below the heated plate 14, as by the provision of the brackets 25, 25 extending parallel to the lateral edges of the upper, heating plate 14. Preferably, the brackets 25, 25 are carried respectively by a set of projections 26, 26 extending from the under face of the upper, heating plate 14 adjacent its opposite lateral edges. The securement of each bracket 25 to its set of projections 26 may be had by reducing the terminal portion of each projection 26, and threading the same for receiving the nuts 27. The threaded end portions are passed through suitable openings in the brackets 25 and the nuts 27 applied to secure the brackets by suspension from the projections 26.

The heater plate 24 is thus held in spaced relation to the heating plate 14, and notwithstanding the free mounting of the heater plate 24 on the edgewise disposed brackets 25, engagement of the heater plate 24 with the brackets 25 is maintained with substantial absence of clearance between the heater plate 24 and the supporting brackets 25; such relation continues irrespective of expansion and contraction of the heater plate 24 due to rise of temperature by the impingement of the flames.

The openings 28 in the rear, vertical plate 29 provide added flue effect at the rear of the combined heating and heater plates.

The free support of the heater plate 24 on its lateral and rear brackets obviates any tendency of substantial warping of the heater plate 24. Upon the heater plate being "burned out", the replacement of the heater plate is readily effected by simple sliding movement relative to the supporting brackets. The arrangement also affords ready reversal of the heater plate to attain uniform "burning out" of the opposite faces of the heater plate.

The invention accordingly provides effective heating of the oven proper without undue localized temperature on or above the heating plate and enables the heating flame to be continued at full force without danger of burning the food.

Such advantages are derived without the use of asbestos sheeting or packing, or equivalent and the desired temperature is obtained by control of the heating resulting by direct radiation and supplemental convection of the heated air currents.

It will be observed that the spacings between the lateral and rearward feet or projections 19, 20 serve as passages for the flow of the heated air from the space between the heater plate 14 and the heating plate 24 to attain the supplemental heating.

Whereas we have described our invention by reference to specific forms thereof it will be understood that many changes and modifications may be made without departing from the spirit of the invention.

We claim:—

1. The combination with an oven structure including supporting flanges on its walls near the bottom of the oven and a burner below the flanges, of an upper heating plate having legs supporting it upon said flanges and spaced above them, and a lower plate of smaller peripheral dimensions than the upper plate, secured below the upper plate in spaced relation thereto and above the burner.

2. A heater plate structure adapted for insertion in an oven including supporting flanges on its side walls near the bottom thereof and a burner located below the flanges, the heater plate structure comprising an upper plate having depending legs adapted to rest on said flanges and support the upper plate above the flanges, a lower plate of smaller area than upper plate and in spaced position below it, and spaced supporting members connecting the lower plate to the upper plate.

In testimony whereof we have signed this specification this 4th day of June, 1924.

CHARLES B. MOSSI.
HENRY ALEXANDER CHEVOLA.